United States Patent Office 3,224,853
Patented Dec. 21, 1965

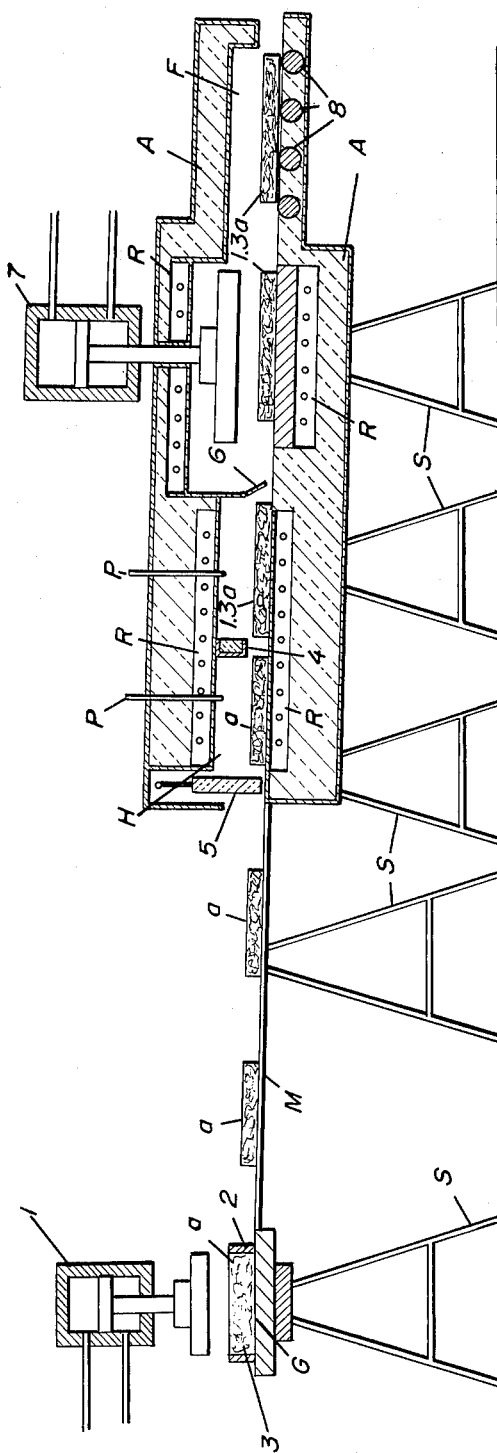

3,224,853
PROCESS FOR INCREASING THE THERMAL INSULATING PROPERTIES OF VITREOUS MATERIALS AND THEIR ADHESION TO COHERENT SUBSTANCES
Tibor Pietsch, Street Santo Domingo de Silos, No. 8, Madrid, Spain
Filed Nov. 17, 1961, Ser. No. 153,210
Claims priority, application Spain, Nov. 25, 1960, 262,757, 262,758
4 Claims. (Cl. 65—18)

The vitreous cellular materials dealth with in this invention relate to all classes of constructions and have adequate tenacious characteristics that permit their permanent alteration of form, some of which materials are glass, fused minerals and in general those materials that contain one or more metallic oxides.

The object of this invention is to increase the thermal insulating property of such materials and at the same time to increase their faculty of adhesion to walls or other surfaces to which they are to be applied as ornamental or other exterior dressing, also concerning their application on to plaster of Paris or mastics or mortars or glues or cements or similar substances.

These two objects of the invention can be carried out, preferably in one and the same process.

With reference first of all to the aspect relating to the increase of the thermal insulating property of these vitreous materials used in building constructions, it is well known, that all studies made up to the present time concerning this thermal property are based on studies of the material itself, on the gas contained within its cells, or on its moisture content or on the apparent specific gravity of the material, but no attention has been paid to the form of these cells from a thermal insulating point of view, in spite of its being of primordial importance in such studies.

This concept of cellular structure in vitreous materials is precisely the factor borne in mind in the present invention.

A cell may be deformed by compression and reduced in height, but it is evident that this same deformation may be obtained by stretching the material, or by applying a longitudinal force, or by a combination of the two forces, the compression in a vertical direction and the stretching horizontally. This deformation lengthens the cells still more and they may even become of a fibrous nature, when insulating values still more advantageous than those previously considered may be obtained.

The cellular deformation as primordial agent in the increase of thermal insulation, is applicable to any material that permits such deformation, including materials of fibrous structure, seeing that the thermal insulating property is better when the heat transmission takes place in a direction perpendicular to the fibres than when it occurs in the same direction.

The other aspect of the present invention relating to the process for increasing the adherence of vitreous materials to the coherent substances of any kind used normally in these constructions, deals with the avoidance of those difficulties arising from the smooth surfaces of said vitreous materials not permitting sound adherence to the mortar, owing to the lack of sufficient porosity in the surfaces of said materials to allow penetration of the binding substance into the pores of the vitreous material and thus produce efficient union, that is to say, that in case of breakage, the rupture occurs in the adhesive material itself, and not at the contact surfaces between said adhesive and the vitreous material.

This defective adherence is the principal inconvenience that limits the employments of these vitreous materials.

Glass, for example whose resistance is ten times superior to good concrete, and twice that of granite, cannot be employed so extensively as it deserves as its adherence to the cementing medium is practically zero, even when its medium is cement mortar which is a good example of a binding material. So that the application of glass for mosaics or combined with tiles cannot be perfect as they loosen with the course of time, while it is impossible to guarantee their adequate lasting properties, unless the mortar or binding material covers them laterally also. The same thing occurs with translucent tiles which lack adherence to the cementing medium, and other fixing means have to be adopted, such as slotting the edges to form canals into which the mortar or adhesive material may penetrate.

The present invention tends to solve this problem by creating an adherence between the vitreous material and the binding medium or mortar between the viterous material and the binding medium or mortar hitherto unknown, and without having to roughen the surface of the vitreous material in contact with the mortar, seeing that such roughing does not alter the smooth vitreous surfaces produced within the sinuous grooves so practised, the newly made surfaces being of the same vitreous superficial nature as the original tile or mosaic, so that the adherence remains just as imperfect.

The process, an object of this invention, consists of making use of the semi-solid or plastic state of the vitreous material while in the furnace, by placing in contact with some another granular material whose melting point is above that of the vitreous material. In this way, the mentioned material of higher melting point becomes imbedded into the molten surface of the vitreous material, without such granular material losing its natural structure.

For example, when dealing with glass, sand is used whose melting point is higher than that of glass, the grains of which become embedded or encrusted into the surface of the glass thus forming a very rough surface which assures very high adhesive properties with the mortar, glue, cement or other cementing medium.

Vitreous materials treated in this manner are perfectly applicable to decorative glass or cellular glass backgrounds; to the borders of translucent tiles; glass and concrete compositions and to many other uses which up to now have not been possible.

A preferred embodiment of the object of the invention is shown in the accompanying figure of an installation for the production of slabs of cellular vitreous material having thermal insulating properties and increased adherence of the coherent substances.

It comprises a cold press 1, a long table M, a furnace H, a hot press 7 and a cooling tunnel F.

The bottom of a metal frame 2 is covered with a thin layer of siliceous sand G and is thereafter filled with a powdered vitreous material that is mixed with a binding substance 3 to constitute a total volume $a$. Having compressed the referred to mass 3, the frame 2 is removed and the volume of the slab $a$ displaced (in this example by hand and by means of rakes) and upon raising the sliding door 5, it is inserted in the furnace H, provided with an electrical resistance R and an insulating casing A.

This furnace is subdivided into two departments that are separated by a suspended partition 4, fitted with pyrometers P in each department. Upon entering the first of these departments, the volume of the slab $a$ is heated to a predetermined initial temperature that will eventually rise to about 800° C. in the second department and thus the volume $a$ thereof will stretch out to $1.3a$ due to a dilatation of its cells. The slab $a$ will then slide through the trap door 6 to be compressed in the press 7, in order to deform its cell structure, while its original volume $1.3a$ is not affected by this operation, and thereafter will pass through the cooling tunnel where it is conveniently displace by means of guide rollers 8 that serve to deliver the finished slab.

The table M, furnace, presses and tunnel are supported by trestles S and the table M can be mechanized by a conveyor belt, if desired.

The siliceous sand G which initially adheres to the bottom of the slab due to the cold pressing operation, remains encrusted during hot pressing while experiencing no fusion whatsoever in virtue of the fact that its melting point is higher than that of the vitreous material being treated.

I claim:

1. A process for increasing the thermal insulating properties of vitreous materials and their adhesion to coherent substances comprising subjecting a vitreous material crushed to a determined fineness of particles, to a cold compressing operation together with a binding material, then immediately raising the temperature to approximately the melting point thereof, then reducing said material in molten state to about one half its height and then progressively cooling the mass.

2. A process as set forth in claim 1 wherein said vitreous material is subjected to said cold compressing operation when covering the bottom of a mold with a thin layer of a granular material having a melting point higher than that of the vitreous material being treated and then raising the temperature to approximately the melting point thereof in combination with the adhered granular layer.

3. A process, in accordance with claim 2 wherein the increase of volume obtained by heating to approximately the melting point thereof can be calculated in a 1.3 proportion of the initial cold volume.

4. A process is accordance with claim 1 wherein said reducing is performed when the heated material has obtained approximately its melting point, so as to reduce its cellular structure to a fibrous formation with a maximum deformation of the cells.

References Cited by the Examiner

UNITED STATES PATENTS

| | | | |
|---|---|---|---|
| 1,076,657 | 10/1913 | Schol | 65—20 |
| 2,067,313 | 1/1937 | Coryell | 65—20 |
| 3,086,898 | 4/1963 | Alford et al. | 65—18 |

DONALL H. SYLVESTER, *Primary Examiner.*